United States Patent
Sacristan et al.

(10) Patent No.: US 7,255,036 B2
(45) Date of Patent: Aug. 14, 2007

(54) PNEUMATIC SERVOMOTOR COMPRISING A DIAPHRAGM AND/OR A JOINT WHICH IS OVERMOULDED ONTO THE SKIRT

(75) Inventors: Fernando Sacristan, Barcelona (ES); Juan Simon Bacardit, Barcelona (ES); Bruno Berthomieu, Barcelona (ES)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 10/556,755

(22) PCT Filed: May 19, 2004

(86) PCT No.: PCT/FR2004/001254

§ 371 (c)(1),
(2), (4) Date: Nov. 15, 2005

(87) PCT Pub. No.: WO2004/103788

PCT Pub. Date: Dec. 2, 2004

(65) Prior Publication Data

US 2006/0213367 A1    Sep. 28, 2006

(30) Foreign Application Priority Data

May 22, 2003    (FR) .................................. 03 06376

(51) Int. Cl.
*B60T 13/52* (2006.01)
*F01B 19/00* (2006.01)

(52) U.S. Cl. .................................. 91/376 R; 92/98 D

(58) Field of Classification Search ............... 91/376 R, 91/369.1; 92/98 D, 99
See application file for complete search history.

(56) References Cited

U.S. PATENT DOCUMENTS

| 3,385,167 | A | * | 5/1968 | Wilson et al. ............. 91/369.4 |
| 3,387,540 | A | * | 6/1968 | Wilson ....................... 91/369.4 |
| 4,393,749 | A | * | 7/1983 | Miyazaki .................. 91/376 R |
| 5,027,693 | A | | 7/1991 | Wilkinson |
| 5,881,627 | A | * | 3/1999 | Simon Bacardit .......... 91/369.1 |

FOREIGN PATENT DOCUMENTS

| DE | 41 21 745 | 7/1993 |
| FR | 2 801 857 | 6/2001 |

* cited by examiner

*Primary Examiner*—Igor Kershteyn
(74) *Attorney, Agent, or Firm*—Leo H. McCormick, Jr.; Sarah Taylor

(57) ABSTRACT

A pneumatic servomotor (12) for an assisted braking having a rigid axial casing (16) with a movable substantially truncated-cone shaped transverse skirt (18) that is integral with a piston (20) for the actuation of an associated master cylinder (14) that defines two pressure chambers (24, 26) inside the casing. A substantially annular sealing diaphragm (30) made of an elastomeric material is interposed between the casing (16) and an outer peripheral area (32) of the skirt (18) has a substantially annular seal (34) made of an elastomeric material is interposed between an inner area of the skirt (18) and the piston (20). The sealing diaphragm (30) and the seal (34) have a portion that is moulded over the skirt (18).

12 Claims, 3 Drawing Sheets

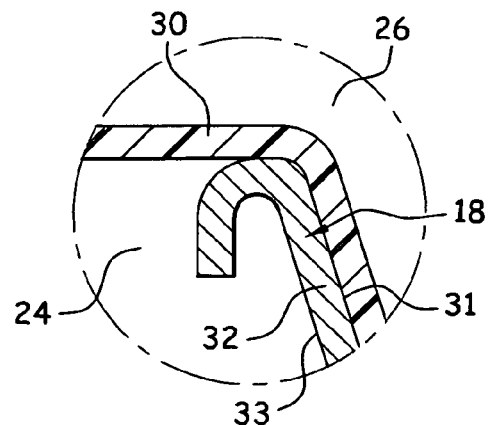
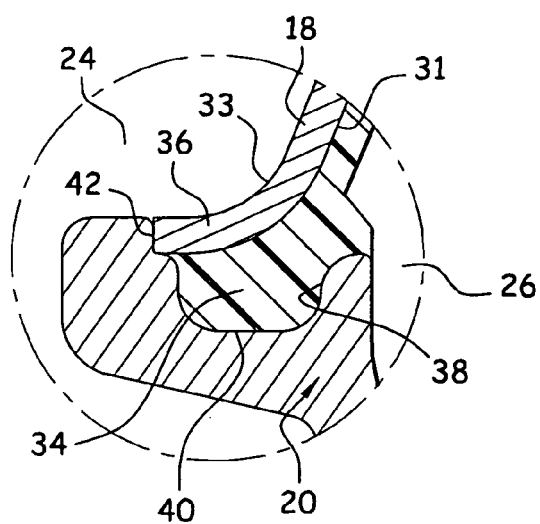
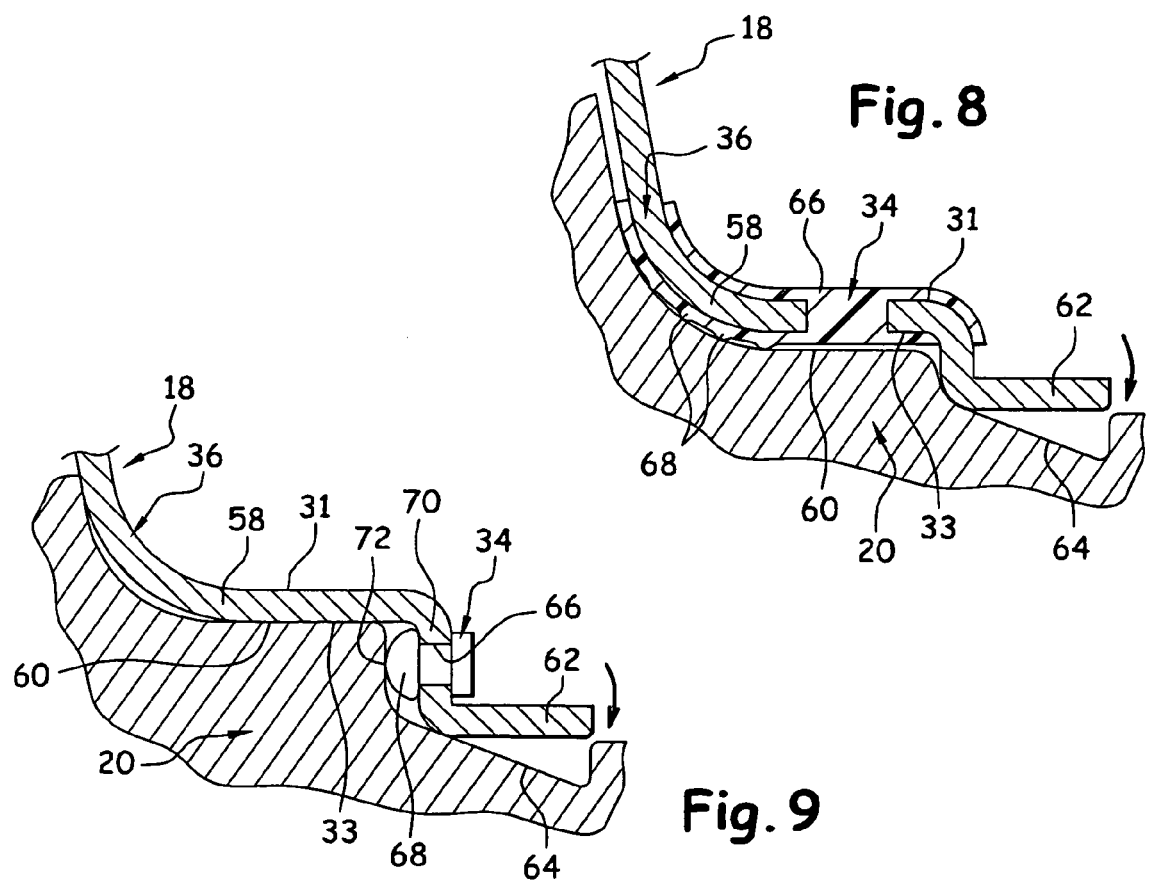

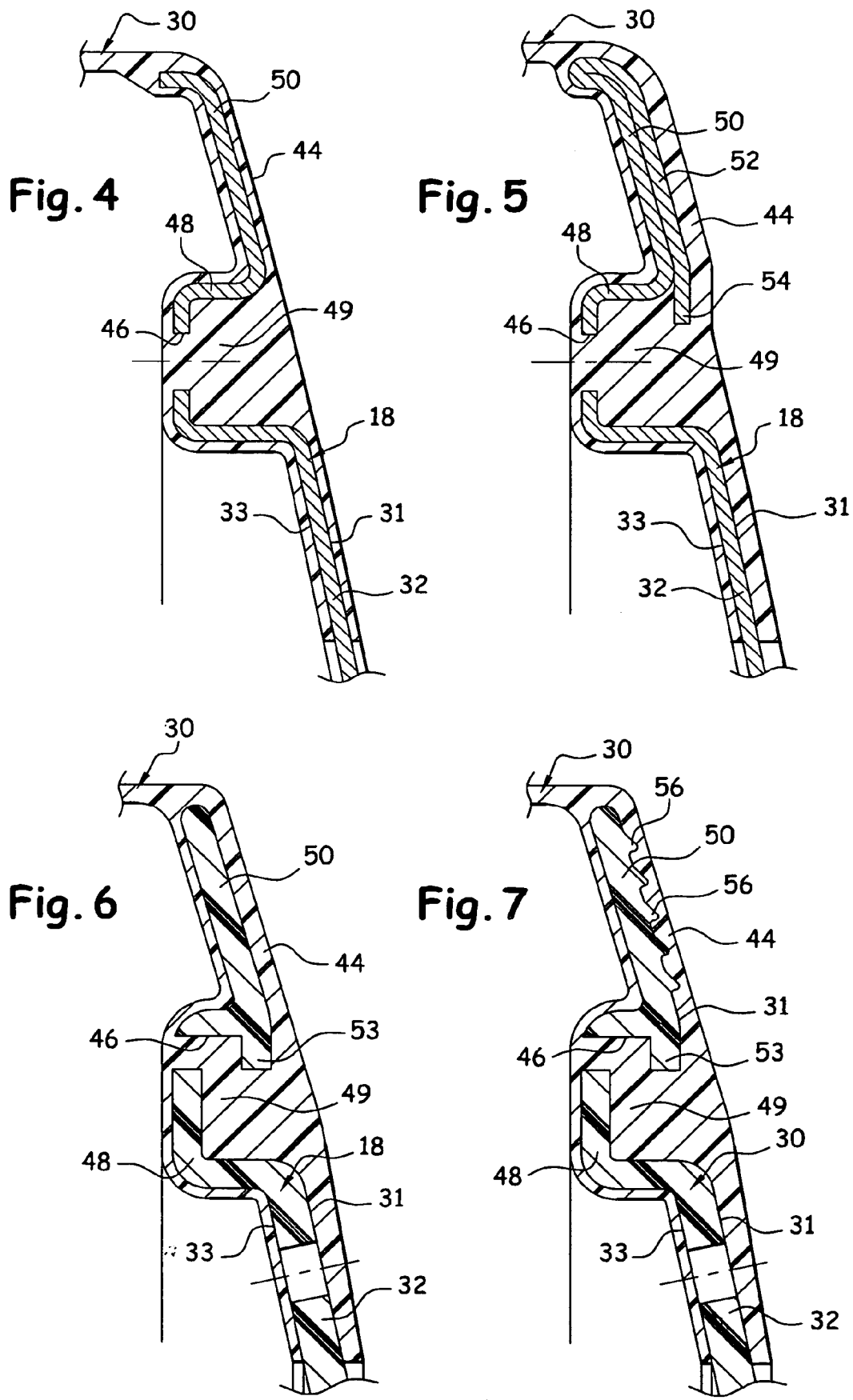

PNEUMATIC SERVOMOTOR COMPRISING A DIAPHRAGM AND/OR A JOINT WHICH IS OVERMOULDED ONTO THE SKIRT

BACKGROUND OF THE INVENTION

This invention relates to a pneumatic servomotor for an assisted braking.

More particularly, the present invention relates to a pneumatic servomotor for an assisted braking, of the type comprising a rigid axial casing, in which a substantially truncated-cone shaped transverse skirt is movable and integral with a piston for the actuation of an associated master cylinder, while it defines two pressure chambers inside the casing; of the type in which a substantially annular sealing diaphragm made of an elastomeric material is interposed between the casing and an outer peripheral area of the skirt; and of the type in which a substantially annular seal made of an elastomeric material is interposed between an inner area of the skirt and the piston.

Numerous implementations of servomotors of said type are well known.

According to a first known design, servomotors were provided, in which bearing faces of the sealing diaphragm and/or of the seal were accommodated inside a groove in the piston. Yet such design has the disadvantage of requiring a careful fitting of the bearing faces in question into the associated grooves, failing which some lack of tightness may occur between the skirt and the seal or between the skirt and the diaphragm, thus connecting the front chamber with the rear chamber of the servomotor.

In order to cope with such a drawback, a second design has been suggested, according to which a diaphragm is made in one piece with the seal and conforms to the rear face of the skirt.

The latter design theoretically eliminates any possible lacks of tightness, likely to appear between the skirt and the seal or between the skirt and the diaphragm, yet no particular arrangements are made for the elastomeric material to adhere to the skirt in a reliable manner. Should such material happen to separate from the skirt, then it might become slack and impair the tightness between the seal and the skirt, or the tightness between the diaphragm and the skirt.

SUMMARY OF THE INVENTION

In order to cope with such a drawback, the present invention provides a servomotor comprising a sealing diaphragm and/or a seal, attached to both sides of the skirt.

To this end, the invention provides a servomotor of the above-described type, characterised in that the sealing diaphragm and/or the seal comprise(s) a portion, which is moulded over the skirt.

According to other characteristics of the present invention:

- an annular portion of the diaphragm, which faces the axis of the servomotor, covers both sides of an outer peripheral truncated-cone shaped area of the skirt, and fills at least a first through-thickness channel provided in said outer peripheral area of the skirt, so as to ensure a continuity of the elastomeric material of the diaphragm;
- the channel is situated facing a projection, formed in the outer peripheral truncated-cone shaped area of the skirt, and intended to constitute an accumulation area for the elastomeric material of the diaphragm, for a more reliable strength of said elastomeric material close to the channel;
- the inner area of the skirt is tubular and it comprises a front tubular section, encompassing a cylindrical bearing face of the piston, and a rear tubular section having a smaller diameter than that of the cylindrical bearing face, and capable of being deformed and/or of being fitted into a groove provided in the piston, rearwards of the cylindrical bearing face;
- the seal lies on both sides of the front tubular section and fills at least a through-thickness hole in said front tubular section, so as to ensure a continuity of the elastomeric material of the seal;
- the seal comprises at least one annular lip, which is interposed between the inner side of the front tubular section and the piston;
- the seal extends over the full length of the front tubular section, and the hole provided in the front section is a radial one;
- the front section comprises a shoulder-forming wall, connecting it to the rear section, and the hole provided in the front section traverses said shoulder-forming wall axially, whereas the seal extends on both sides of the shoulder-forming wall, and the annular lip is disposed in line with the hole;
- the skirt is manufactured using a stamping process, carried out on a sheet-metal blank, and the channel consists of a bored hole;
- the edge of the outer peripheral truncated-cone shaped area of the skirt, which is situated radially outwards of the projection, comprises a folding over of the blank sheet, so as to strengthen the skirt at its outer periphery;
- the fold extends at least in part opposite the projection in order to confine the elastomeric material of the diaphragm in the projection;
- the skirt is moulded from a plastic material, and the channel consists of a baffle extending through the outer peripheral truncated-cone shaped area of the skirt;
- the rear face of the edge of the outer peripheral truncated-cone shaped area, which is situated radially outwards of the projection, comprises at least two concentric annular teeth so as to fix the elastomeric material of the diaphragm in position on the skirt;
- the diaphragm is made in one piece with the seal.

Other features and advantages of the present invention will be apparent from the following detailed description, when taken in conjunction with the accompanying drawings.

BRIEF DESCRIPTION OF THE INVENTION

FIG. 2 is a detail axial sectional view of the outer peripheral area of the skirt of the servomotor according to Detail II indicated in FIG. 1;

FIG. 3 is a detail axial sectional view of the inner area of the skirt of the servomotor according to Detail III indicated in FIG. 1;

FIG. 4 is a detail axial sectional view of a first embodiment of the outer peripheral area of the sheet-metal skirt of a servomotor according to the present invention;

FIG. 5 is a detail axial sectional view of a second embodiment of the outer peripheral area of the sheet-metal skirt of a servomotor according to the present invention;

FIG. 6 is a detail axial sectional view of a first embodiment of the outer peripheral area of the plastic skirt of a servomotor according to the present invention;

FIG. 7 is a detail axial sectional view of a second embodiment of the outer peripheral area of the plastic skirt of a servomotor according to the present invention;

FIG. 8 is a detail axial sectional view of a first embodiment of the inner area of the sheet-metal skirt of a servomotor according to the present invention; and FIG. 9 is a detail axial sectional view of a second embodiment of the inner area of the sheet-metal skirt of a servomotor according to the present invention.

DETAILED DESCRIPTION OF THE INVENTION

Figure 1:
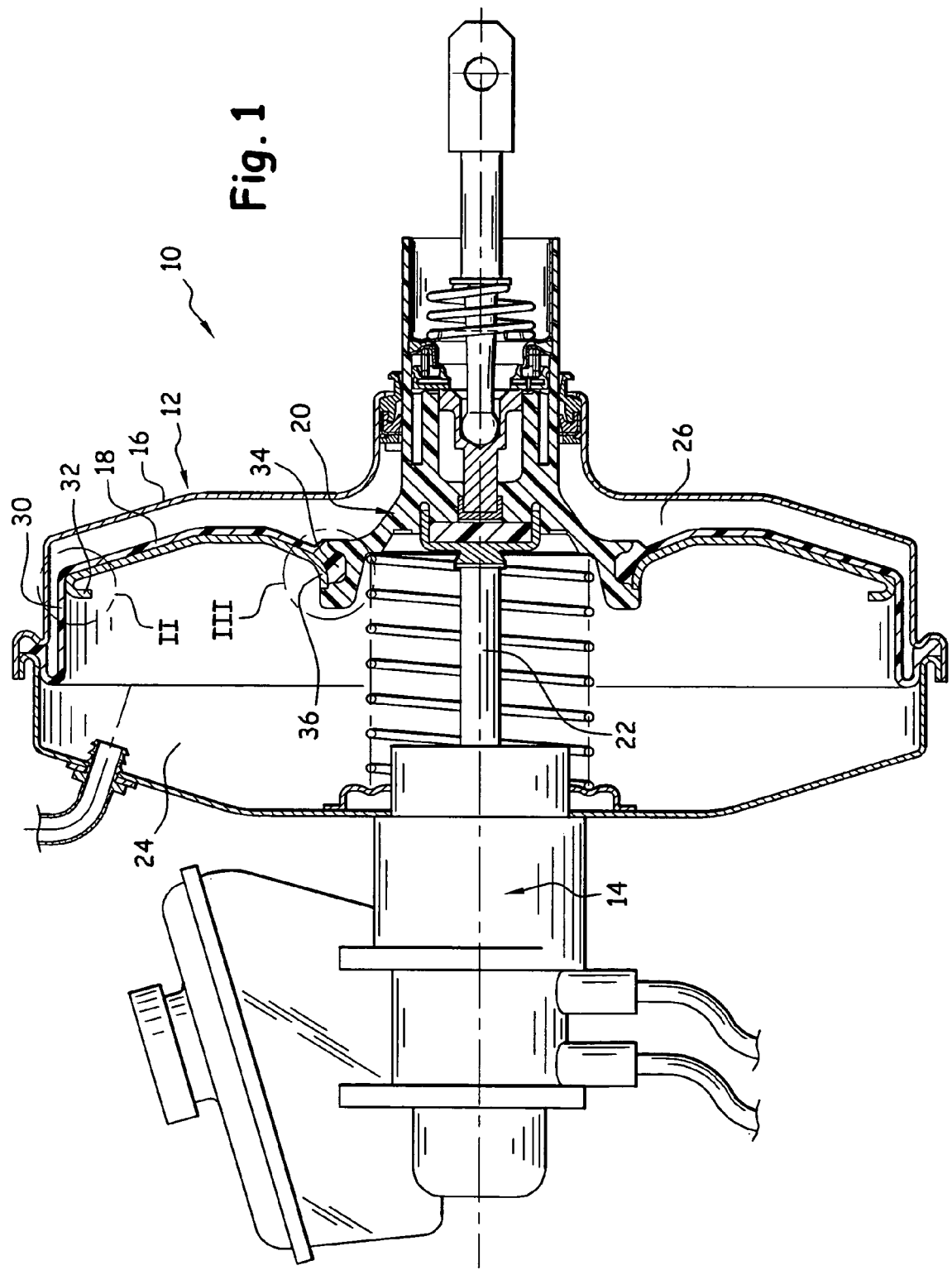
FIG. 1 is an axial sectional view of a servomotor according to a prior art.

In the following description, the same reference numerals will designate the same elements, or elements having similar functions.

As a rule, the terms "front", "rear", "upper" and "lower" refer respectively to elements or positions facing leftwards, rightwards, upwards or downwards in the figures.

FIG. 1 shows a servobrake 10 for a motor vehicle, comprising a braking-assistance pneumatic servomotor 12, which actuates a braking master cylinder 14.

In a well-known manner, the servomotor 12 comprises a rigid axial casing 16, in which a substantially truncated-cone shaped skirt 18 is movably mounted in an airtight manner, such skirt being integral with a piston 20 for the actuation of the associated master cylinder 14, through a push rod 22.

As is well known too, the skirt 18 defines, inside the casing 16, two pressure chambers, namely a front pressure chamber 24 and a rear pressure chamber 26, which may be subjected to different pressures, so as to achieve the travel of the skirt 18 and, accordingly, the actuation of the push rod 22.

Since such a configuration is known from the state of the art, it will not be further described herein.

In a well-known manner, a sealing diaphragm 30, which is substantially annular and made of an elastomeric material, is interposed between the casing 16 and an outer peripheral area 32 of the skirt 18, and a seal 34, which is substantially annular and made of an elastomeric material, is interposed between an inner area 36 of the skirt 18 and the piston 20. According to the state of the art, the diaphragm 30 and the seal 34 may be made in one piece, as shown in FIG. 1 in which the diaphragm 30 and the seal 34 are continuous and cover the whole rear face 31 of the skirt 18, but such an arrangement is in no way limitative of the known configurations, and designs according to which the diaphragms 30 and the seals 34 are independent of each other are also well known from the state of the art.

FIG. 2 represents the diaphragm 30 as indicated by Detail II in FIG. 1, whereas FIG. 3 shows the seal 34 as indicated by Detail III in FIG. 1.

As appears from FIG. 2, generally the diaphragm 30 is merely attached to the rear face 31 of the skirt 18, for instance by adhesive bonding, or by a vulcanization in the course of the manufacturing of the diaphragm 30. But, owing to the fact that the diaphragm 30 does not extend onto the front face 33, the air inside the rear chamber 26 may escape to the front chamber 24, should the diaphragm 30 happen to separate from the skirt 18.

Similarly, as illustrated in FIG. 3, generally the seal 34 is fixed in position between the rear face 31 of the skirt 18 and a front end wall 38 of a groove 40 provided in the piston 20, more particularly because the seal 34 is fitted into the groove. But, owing to the fact that the seal 34 does not extend onto the front face 33, if the seal 34 happens to separate from the skirt 18, the air inside the rear chamber 26 may pass round the seal 34, escape through the groove 40 and the end 42 of the skirt 18 and flow into the front chamber.

So as to cope with the above-mentioned drawbacks, FIG. 4 et seq show a servomotor 12 according to this invention and of the above-described type, characterised in that the sealing diaphragm 30 and/or the seal 34 comprises a portion which is moulded over the skirt 18.

For this purpose, as shown in FIGS. 4 through 7, an annular portion 44 of the diaphragm, which faces the axis of the servomotor 12, covers both sides corresponding to the faces 31 and 33 of the outer peripheral truncated-cone shaped area 32 of the skirt 18, and fills at least a first through-thickness channel 46 provided in said outer peripheral area 32 of the skirt 18, so as to ensure a continuity of the elastomeric material of the diaphragm 30. Therefore, the filling of the channel 46 is carried out in the course of the polymerization of the elastomeric material of the diaphragm 30.

More specifically, the channel 46 is situated facing a projection 48, formed in the outer peripheral truncated-cone shaped area 32 of the skirt 18. Such projection 48 is intended to constitute an accumulation area 49 for the elastomeric material of the diaphragm 30, for a more reliable strength of said elastomeric material close to the channel 46. In particular, thanks to such an arrangement, a shear of the material of the diaphragm 30 across the channel 46 may be avoided.

FIGS. 4 and 5 show that the skirt 18 may be manufactured using a stamping process, carried out on a sheet-metal blank, in which case the channel 46 consists of a bored hole, and the projection 48 is formed in the course of the stamping of the blank out of which the skirt 18 is shaped.

According to a first embodiment of the sheet-metal skirt 18 as shown in FIG. 4, the skirt 18 is stamped so as to have the same thickness throughout.

According to a second embodiment of the sheet-metal skirt 18 as shown in FIG. 5, the skirt 18 may be stamped and then doubled upon itself so as to exhibit a twofold thickness locally.

Thus, the edge 50 of the outer peripheral truncated-cone shaped area 32, which is situated radially outwards of the projection 48, comprises a fold 52 of the sheet metal of the blank, so as to strengthen the skirt 18 at its outer periphery.

In an advantageous manner, an end 54 of the fold 52 extends at least in part opposite the projection 48 in order to confine the elastomeric material of the diaphragm 30 in the projection 48.

FIGS. 6 and 7 show that the skirt 18 may be moulded from a plastic material, in which case the channel 46 consists of a baffle extending through the outer peripheral truncated-cone shaped area 32 of the skirt 18. The skirt 18 comprises a projection 48 which, similarly to the above-described one, is intended to constitute an accumulation area 49 for the elastomeric material of the diaphragm 30, for a more reliable strength of the elastomeric material close to the channel 46. Most advantageously, the projection 48 is formed during the moulding of the plastic material for the skirt 18.

Quite advantageously too, a lug 53, similar to the end 54 of the fold 52, as hereinabove described with reference to FIG. 5, extends at least in part opposite the projection 48, in order to confine the elastomeric material of the diaphragm 30 in the projection 48.

According to a first embodiment of the skirt made of a plastic material as shown in FIG. 6, the edge 50 of the outer peripheral truncated-cone shaped area 32 is smooth.

According to a second embodiment of the skirt made of a plastic material as shown in FIG. 7, the rear face 31 of the edge 50 of the outer peripheral truncated-cone shaped area 32, which is situated radially outwards of the projection 48, comprises at least two concentric annular teeth 56, so as to fix the elastomeric material of the diaphragm 30 radially in position on the skirt 18. Said teeth contribute to the interpenetration of the elastomeric material of the diaphragm 30 and of the plastic material of the skirt 18.

In a similar manner, FIGS. 8 and 9 illustrate a first and a second embodiments of the seal 34 associated with a skirt 18. In these figures, the skirt 18 is shown as a skirt 18 formed out of a stamped sheet-metal blank but it goes without saying that the skirt 18 might just as well consist of a moulded plastic material, as set forth hereinabove.

FIGS. 8 and 9 show that the inner area 36 of the skirt 18 comprises a front tubular section 58, encompassing a cylindrical bearing face 60 of the piston 20, and a rear tubular section 62 having a smaller diameter than that of the cylindrical bearing face 60, and capable of being deformed and/or of being fitted into a groove 64 provided in the piston, rearwards of the cylindrical bearing face 60. More particularly, when the skirt 18 is made out of sheet metal, the section 62 is designed for a deformation, in the direction of the arrows in FIGS. 8 and 9, so as to reach the bottom of the groove 64 whereas, if the skirt 18 consists of a plastic material, the section 62 conforms to the shape of the groove 64, and it will become deformed so as to fit into said groove 64.

Whatever the contemplated embodiment may be, the seal 34 lies on both sides 31, 33 of the front tubular section 58, and it fills at least a through-thickness hole 66 in said front tubular section 58, so as to ensure a continuity of the elastomeric material of the seal 34.

Besides, the seal 34 comprises at least one annular lip 68, which is interposed between the inner side, corresponding to the face 33 of the front tubular section 58, and the piston 20.

According to the first embodiment, as illustrated in FIG. 8, the seal 34 extends over the full length of the front tubular section 58, and the hole 66 in the front section 58 is a radial one.

According to this arrangement and in a preferred manner, the seal 34 comprises a plurality of lips 68, in contact with the bearing face 60 of the piston 20.

In a second embodiment, as represented in FIG. 9, the front section 58 comprises a shoulder-forming wall 70, connecting it to the rear section 62. The hole 66 provided in the front section 58 traverses said shoulder-forming wall 70 axially, whereas the seal 34 extends on both sides 31, 33 of the shoulder-forming wall 70, and the annular lip 68 is disposed in line with the hole 66 and in contact with a front end wall 72 of the groove 64 provided in the piston 20.

In the preferred embodiment of this invention, the diaphragm 30 is made in one piece with the seal 34, and it covers the front face 31 and the rear face 33 of the skirt 18. Of course, such an arrangement is by no means limitative of the invention, and the diaphragm 30 and the seal 34 may be independent of each other.

Quite advantageously therefore, this invention makes it possible to improve the tightness and to reduce a leakage risk between the skirt 18 and the diaphragm 30 and/or the seal 34 of a servomotor 12.

What is claimed is:

1. A pneumatic servomotor (12) for assisted braking comprising a rigid axial casing (16), in which a substantially truncated-cone shaped transverse skirt (18) is movable and integral with a piston (20) for the actuation of an associated master cylinder (14), said skirt defining two pressure chambers (24, 26) inside the casing in which a substantially annular sealing diaphragm (30) made of an elastomeric material is interposed between the casing (16) and an outer peripheral area (32) of the skirt (18); and in which a substantially annular seal (34) made of an elastomeric material is interposed between an inner area (36) of the skirt (18) and the piston (20), characterised in that the sealing diaphragm (30) and/or the seal (34) comprise(s) a portion, which is moulded over the skirt (18), said portion including an annular portion (44) of the diaphragm (30), that faces the axis of the servomotor (12), covers both sides (31, 33) of an outer peripheral truncated-cone shaped area (32) of the skirt (18), and fills at least a first through thickness channel (46) provided in said outer peripheral area (32) of the skirt (18), so as to ensure a continuity of the elastomeric material of the diaphragm (30), said channel (46) is situated facing a projection (48), formed in the outer peripheral truncated-cone shaped area (32) of the skirt (18), creating an accumulation area (49) for the elastomeric material of the diaphragm (30) to provide more reliable strength of said elastomeric material close to the channel (46).

2. The pneumatic servomotor (12) according to claim 1 characterised in that the inner area (36) of the skirt (18) is tubular. And in that it comprises a front tubular section (58) encompassing a cylindrical bearing face (60) of the piston (20), and a rear tubular section (62) having a smaller diameter than that of the cylindrical bearing face (60), and capable of being deformed and/or of being fitted into a groove (64) provided in the piston (20), rearwards of the cylindrical bearing face (60).

3. The pneumatic servomotor (12) according to claim 2, characterised in that the seal (34) lies on both sides (31, 33) of the front tubular section (58), and fills at least a through-thickness hole (66) provided in said front tubular section (58), so as to ensure a continuity of the elastomeric material of the seal (34).

4. The pneumatic servomotor (12) according to claim 3, characterised in that the seal (34) comprises at least one annular lip (68), which is interposed between the inner side (33) of the front tubular section (58) and the piston (20).

5. The pneumatic servomotor (12) according to claim 4, characterized in that the seal (34) extends over the full length of the front tubular section (58), and in that the hole (66), provided in the front section, is a radial one.

6. The pneumatic servomotor (12) according to claim 4, characterised in that the front section (58) comprises a shoulder-forming wall (70), connecting it to the rear section (62), in that the hole (66) provided in the front section traverses said shoulder-forming wall (70) axially, and in that the seal (34) extends on both sides (31, 33) of the shoulder-forming wall (70), whereas the annular lip (68) is disposed in line with the hole (66).

7. The pneumatic servomotor (12) according to claim 6, characterised in that the skirt (18) is manufactured using a stamping process, carried out on a sheet-metal blank, and in that the channel (46) consists of a bored hole.

8. The pneumatic servomotor (12) according to claim 7, characterised in that the edge (50) of the outer peripheral truncated-cone shaped area (32), which is situated radially outwards of the projection (48), comprises a fold (52) of the blank sheet, so as to strengthen the skirt (18) at its outer periphery.

9. The pneumatic servomotor (12) according to claim 6, characterised in that the fold (52) extends at least in part opposite the projection (48), in order to confine the elastomeric material of the diaphragm (30) in the projection (48).

10. The pneumatic servomotor (12) according to claim 6, characterised in that the skirt (18) os moulded from a plastic material, and in that the channel (46) consists of a baffle extending through the outer peripheral truncated-cone shaped area (32) of the skirt (18).

11. The pneumatic servomotor (12) according to claim 10, characterised in that the rear face (31) of the edge (50) of the outer peripheral truncated-cone shaped area (32), which is situated radially outwards of the projection (48), comprises at least two concentric annular teeth (56), so as to fix the elastomeric material of the diaphragm (30) radially in position on the skirt (18).

12. The pneumatic servomotor (12) according to claim 11, characterised in that the diaphragm (30) is made in one piece with the seal (34).

\* \* \* \* \*